H. A. RHINEVAULT.
MACHINE FOR MAKING HELICALLY COILED WIRE ARTICLES SUCH AS SPRINGS AND THE LIKE.
APPLICATION FILED FEB. 7, 1920.

1,431,757.

Patented Oct. 10, 1922.

Inventor
Harry A. Rhinevault
By Geo. I. Haight
His Atty.

H. A. RHINEVAULT.
MACHINE FOR MAKING HELICALLY COILED WIRE ARTICLES SUCH AS SPRINGS AND THE LIKE.
APPLICATION FILED FEB. 7, 1920.

1,431,757.

Patented Oct. 10, 1922.

Inventor
Harry A. Rhinevault
By Geo. I. Haight
His Atty.

H. A. RHINEVAULT.
MACHINE FOR MAKING HELICALLY COILED WIRE ARTICLES SUCH AS SPRINGS AND THE LIKE.
APPLICATION FILED FEB. 7, 1920.

1,431,757.

Patented Oct. 10, 1922.

Inventor
Harry A. Rhinevault
By Geo. I. Haight
His Atty.

Patented Oct. 10, 1922.

1,431,757

UNITED STATES PATENT OFFICE.

HARRY ARNOLD RHINEVAULT, OF CHICAGO, ILLINOIS.

MACHINE FOR MAKING HELICALLY-COILED WIRE ARTICLES, SUCH AS SPRINGS AND THE LIKE.

Application filed February 7, 1920. Serial No. 356,879.

*To all whom it may concern:*

Be it known that I, HARRY A. RHINEVAULT, a citizen of the United States, residing at Chicago, in the county of Cook and State of Illinois, have invented a certain new and useful Improvement in Machines for Making Helically-Coiled Wire Articles, Such as Springs and the like, of which the following is a full, clear, concise, and exact description, reference being had to the accompanying drawings, forming a part of this specification.

This invention relates to improvements in machines for making helically coiled wire articles such as springs and the like.

In practically all of the mechanical arts, there are employed great quantities of helically coiled springs of wire which vary greatly in length, contour and spacing of the turns of the coils. In some instances, springs are employed which are of uniform diameter throughout and also have uniform spacing of the turns of the coil. In other instances, the diameter of the coil varies throughout the length of the coil, the diameters being larger at some places than at others. In still other instances, the spacings between the turns of the coil may vary, some of the turns being coiled in close contact in one part of the article and the turns being variably spaced in other parts of the article. It also frequently happens that helically coiled articles involve various combinations of shapes and spacing of the turns as, for instance, in what may be termed the springs used on electric flat irons, toasters and other electrical apparatus to protect the wire cord where it leaves a fixed part of the electrical device.

As will be obvious to those skilled in the art, it is highly essential that springs and other like articles of the type hereinbefore indicated be manufactured in large quantities and at very small expense in order to be of commercial utility. It is impractical, from an economical standpoint, to have separate machines for forming each different type of spring or other like article but, so far as I am aware, no satisfactory single machine has ever heretofore been designed which can be readily changed to produce all of the helically coiled wire articles of the various different types hereinbefore mentioned.

One object of my invention is to provide a machine for automatically forming helically coiled wire articles in the nature of springs which machine can be readily adjusted or changed to form articles of the character indicated involving any desired predetermined combination of shapes and spacing of the turns of the coil, within the minimum and maximum limits of the machine.

Another object of my invention is to provide a machine of the character indicated in the preceding paragraph which will operate automatically to produce the articles desired at a high rate of speed.

Still another object of my invention is to provide a machine for helically coiling wire articles, such as springs and the like, embodying any desired combination of forms and spacing of the turns wherein the required changes or adjustments in the machine to vary the type of article produced are effected principally by means of two readily accessible cams of the utmost simplicity.

A still further object of my invention is to provide a machine of the character indicated in the preceding paragraph wherein the cams therein mentioned may be adjusted and shaped by simple filing in such manner that the operator can observe the results of the changes in the contours of the cams as the work on the cams progresses.

The invention furthermore consists in the improvements in the parts and devices and in the novel combinations of the parts and devices herein shown, described and made the subject matter of claims.

In the drawings forming a part of this specification.

Referring to said drawings, the machine for helically coiling wire articles employs a suitable framework consisting preferably of a front vertically extending wall 20 in the form of a casting, a rear similar wall 21 also in the form of a casting, the said walls being united by a number of horizontally extending bolts 22—22. The power shaft is located near the bottom of the machine as indicated at 23, the latter being driven from any suitable source of power as by means of a belt and pulley, the later being indicated at 24 in Figure 5. As will be understood, there will preferably be a fast and loose pulley and the belt is adapted to be shifted by means of the shipper fork 25 which can be operated by the handle 26 on the front of the machine, shown in Figure 1.

Figure 1:
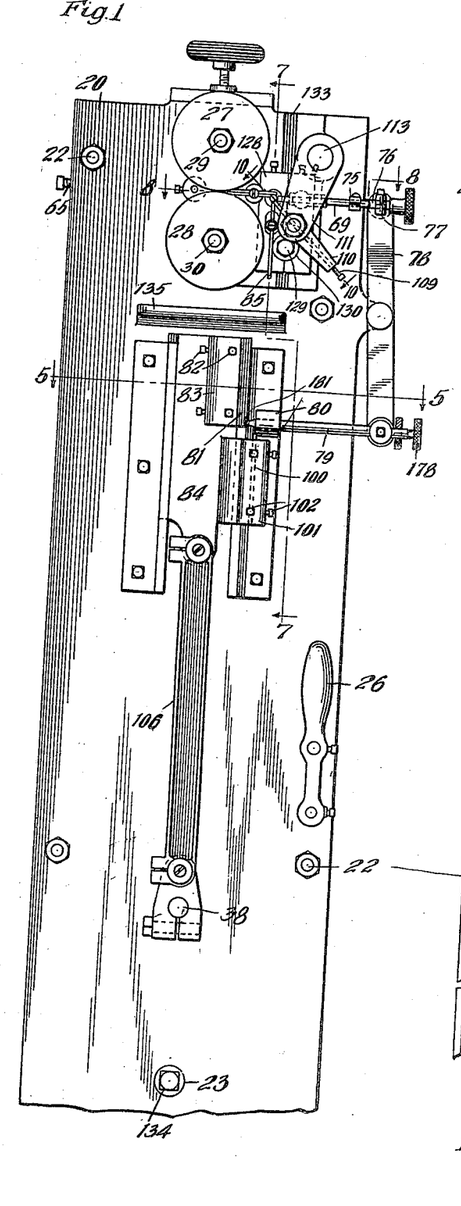
Figure 1 is an elevational view of the front of a machine embodying my invention.
Figure 2:
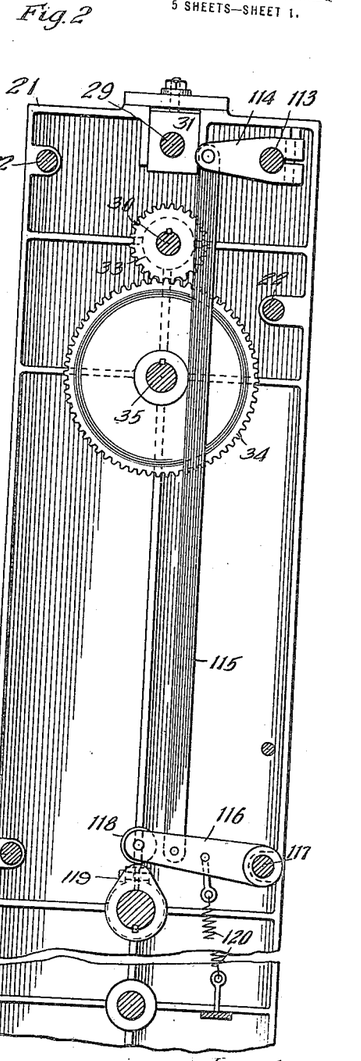
Figure 2 is a vertical sectional view in a plane parallel to the front face of the machine, the section corresponding to the line 2—2 of Figure 4.

The wire is fed from a spool or reel by the two feed rolls 27 and 28 indicated in Figure 1. The latter are mounted on horizontally extending shafts 29 and 30, respectively, the upper shaft 29 being preferably mounted in an adjustable journal box 31. The shafts 29 and 30 are provided at their rear ends with meshing gears 32 of the same diameter and the lower shaft 30, within the frame, carries a gear 33 which meshes with a larger gear 34 carried on a shaft 35. (See Figures 2 and 3). The shaft 35 is intermittently rotated during each cycle of operations by the following means.

Figure 3:
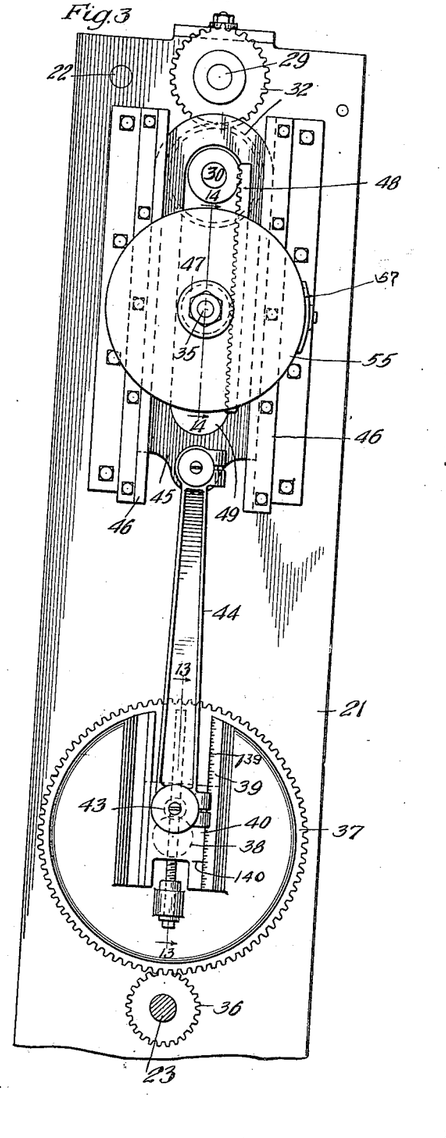
Figure 3 is an elevational view of the back of the machine, the power shaft being shown in section.

Referring to Figure 3, it will be noted that the power shaft 23 carries a driving gear 36 which meshes with a larger gear 37 carried on a shaft 38. The gear 37 is formed with a guideway 39 on its outer face in which is adjustably slidably mounted a cross head 40, the adjustment of the cross head being effected by an adjusting screw 41 threaded in the cross head and swivelly mounted in a bracket 42 on the gear 37. The cross head 40 is provided with a crank pin 43 with which is connected a pitman 44. The upper end of the pitman is pivotally connected to an elongated cross head 45 which is slidably mounted in suitable guide brackets 46—46 carried on the rear side of the machine frame. By adjusting the cross head 40 and thereby the crank pin 43 radially of the gear 37, it is evident that the stroke of the cross head 45 can be adjusted to any desired degree within the limits provided for on the machine. In other words, the length of the stroke employed in feeding the wire, is readily adjusted through the instrumentality of the cross head 40.

Figure 14:
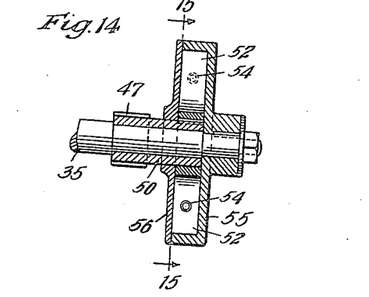
Figure 14 is a vertical sectional view corresponding substantially to the line 14—14 of Figure 3 to illustrate the details of the clutch employed in my machine.
Figure 15:
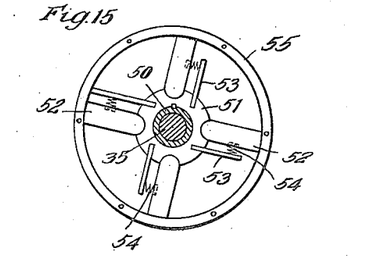
Figure 15 is a vertical sectional view corresponding substantially to the line 15—15 of Figure 14.

The shaft 35, at its rear end on the outside of the frame carries a loosely journaled gear 47 thereon with which cooperates a rack gear 48 formed on the cross head 45, the latter being suitably centrally slotted as indicated at 49 to accommodate the gear 47. The gear 47 is provided with a sleeve 50 (see Figure 14) and to the latter is keyed a disc 51. The disc 51 is provided with a plurality of approximately radially extending fingers 52 pivotally mounted on the disc 51 and having a limited swing with respect thereto. The disc 51 also is provided with a corresponding set of rigid fingers 53 and a spring 54 is interposed between and suitably mounted on each set of fingers 52 and 53. The outer ends of the fingers 52 cooperate with the interior of a casing 55 which is keyed to the shaft 35 at the outer end of the latter. The casing 55 preferably employs a cover plate 56 to enclose the movable parts of the clutch.

With the arrangement shown, it is evident that, upon every downward stroke of the cross head 45, the gear 47 will be rotated and, through the disc 51, fingers 52 and casing 55 will actuate the shaft 35. During the upward movements of the cross head 45, the gear 47, disc 51 and fingers 52 will rotate freely within the casing 55 without actuating the shaft 35 and I provide a friction brake 57 (see Figure 3) bearing on the casing 55 so as to prevent any possibility of the latter being rotated during the upward strokes of the cross head 45. Particular attention is directed at this point to the form of clutch which I utilize in my machine and which contributes materially to the successful operation thereof. It will be noted that each of the fingers 52 normally extends at a very acute angle with a radius extending from the center of the shaft 35 through the center of oscillation of the finger 52 on the disc 51. Consequently, the gripping action of the clutch will take place instantaneously with the beginning of the rotation of the gear 47 as the cross head 45 starts downwardly. With such a construction, the feeding of the wire is rendered uniform during each cycle of movements and there is no possibility of variations in the length of wire fed for each article formed as is true of other types of clutches such as those employing a pawl and ratchet where the pawl may not instantly cooperate with a tooth of the ratchet at the beginning of the feeding stroke.

Figure 8:
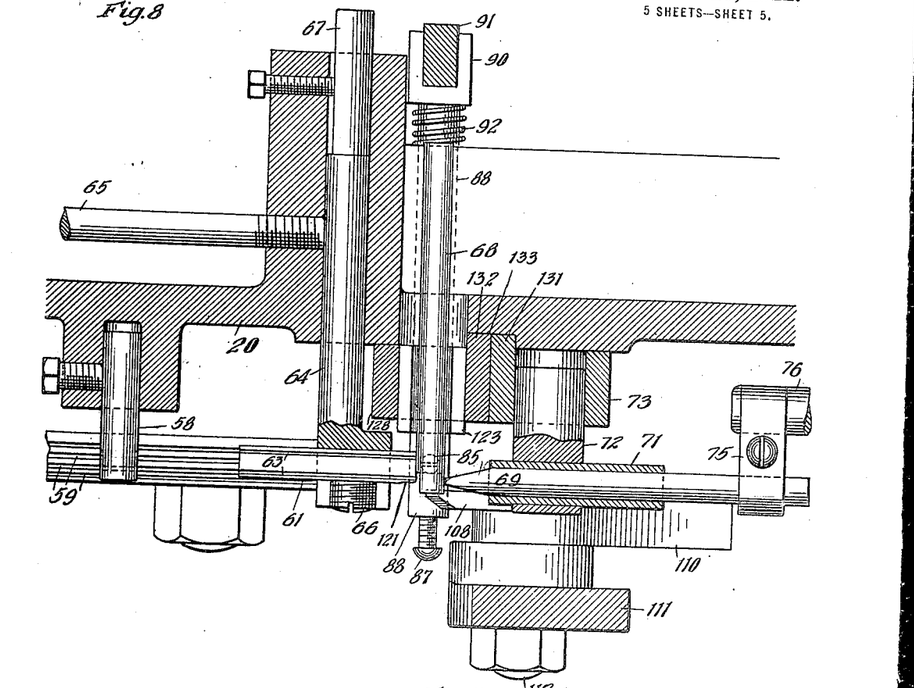
Figure 8 is an enlarged horizontal sectional view corresponding substantially to the line 8—8 of Figure 1.
Figure 10:
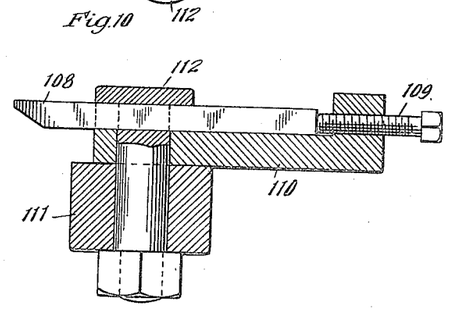
Figure 10 is a detail sectional view corresponding substantially to the line 10—10 of Figure 1 and illustrates more particularly the cutting or shearing tool.
Figures 11, 12:
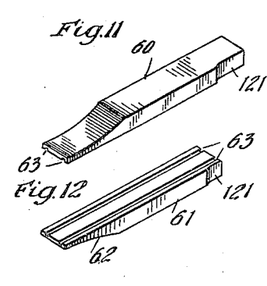
Figures 11 and 12 are detail perspectives of the upper and lower parts, respectively, of the wire-guiding die or block.
Figure 13:
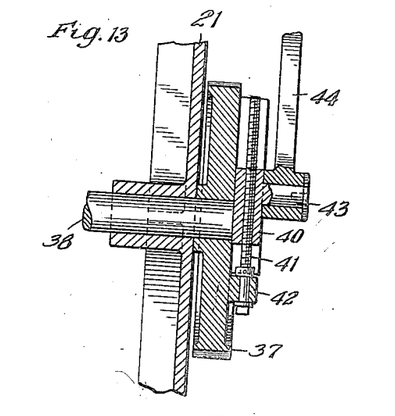
Figure 13 is a detail sectional view corresponding substantially to the line 13—13 of Figure 3.

As heretofore indicated, the wire is fed from a spool or reel and before reaching the feed rolls 27 and 28, preferably passes through a guiding pin 58 adjustably mounted in the frame of the machine, as indicated in Figure 8. The rolls 27 and 28 are formed with a plurality of grooves 59 in their peripheries, said grooves varying in depth for the different sizes of wire being used. The wire passes from the feed rolls through a guiding die consisting of two parts 60 and 61 and shown in detail in Figures 9, 11 and 12. The parts 60 and 61 are tapered or beveled as indicated at 62 so as to permit the die to be positioned close to the feed rolls. On their inner faces, the parts 60 and 61 are provided with corresponding opposed grooves 63—63, it being understood that the latter are adapted to be brought into alinement with the particular grooves on the feed rolls from which the wire is delivered and for this purpose, the guiding die is mounted in a heavy pin 64 adjustably mounted in the frame of the machine and adapted to be secured in any desired position by the elongated set screw 65. The die is secured in the outer headed end of the pin 64 by a machine screw 66. An adjustably mounted gauge pin 67 is provided to cooperate with the pin 64 so that, in the event the pin 64 carrying the guiding die is removed, as when starting on a new supply of wire, the pin 64 can be returned to its original position which will be determined by the pin 67.

The wire as it leaves the guiding die passes over a mandrel 68 into engagement with a forming tool 69, the latter being tapered at its operative end and provided with a groove 70 therein to receive and guide the wire. As will be evident, the position of the forming tool 69, radially, with respect to the axis of the mandrel 68 will determine the diameter of the turns of the helically coiled article being formed. The forming tool 69 is therefore movably mounted in a guiding sleeve 71 frictionally held by a heavy pin 72 which in turn is adjustably mounted, inwardly and outwardly, in a block 73, as clearly indicated in Figure 8. The pin 72 is held in any adjusted position by a set screw 74. By the inward and outward adjustment just described, it is evident that the forming tool 69 can always be brought into alinement with the wire as it is delivered from the guiding die.

Figure 4:
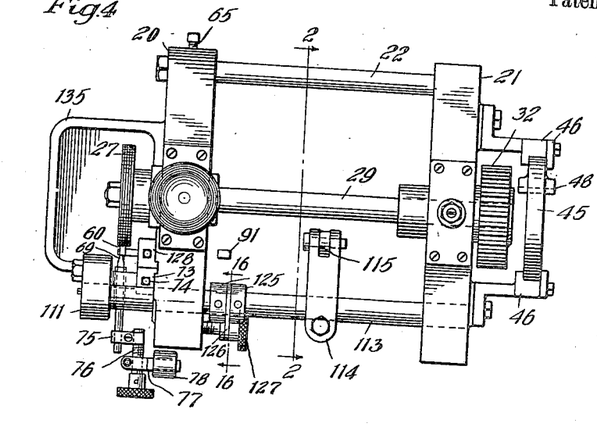
Figure 4 is a top plan view of the machine.

The operative position of the forming tool 69 is governed by the following arrangement. The tool 69 is adjustably clamped in a block 75, the block being adjustably mounted on a screw 76 which in turn is carried by another block 77 pivotally mounted on the upper end of a lever 78 (see Figures 1, 4 and 8). The lever 78 is suitably pivotally mounted on the frame of the machine, intermediate its ends, and at its lower end has pivotally attached thereto a rod 79 (see Figure 1) the inner end of which is guided in a bearing 80. The rod 79 is rounded at its inner end and is adapted to cooperate with a plate cam 81 which is adjustably mounted by suitable set screws 82 in a block-like projection 83 carried by a cross head 84 at the front of the machine, movement to which is imparted by a pitman 106 operated from a wrist pin on the shaft 38. (See Figures 1, 5 and 7). As clearly evident from an inspection of Figure 5, the plate cam 81 is located in a plane parallel to the front wall of the machine and in line with the rod 79. The cam 81 is adjustable in said plane and can be held in any desired position by the set screws 82. By referring to Figure 1, it will be seen that the contour of the edge of the plate cam 81 determines the operative position of the forming tool 69 and consequently, by changing the contour of the edge of the cam plate 81, coiled articles of any desired contour can be obtained. For instance, as shown in Figure 1, the lower edge of the cam 81 is beveled for a very short distance as indicated at 181 which permits of the forming tool 69 being somewhat removed from the mandrel 68 during the beginning of the coiling of the spring or the like, the forming tool 69 being brought gradually closer to the mandrel 68 as the plate cam 81 descends and until such time as the straight edge of the plate cam is in engagement with the inner end of the rod 79. This produces a spring or other article whose starting diameter is gradually reduced at the beginning of the formation of the coil and thereafter remains uniform, as illustrated for example by the form of spring 281 shown in Figure 17.

Figure 5:
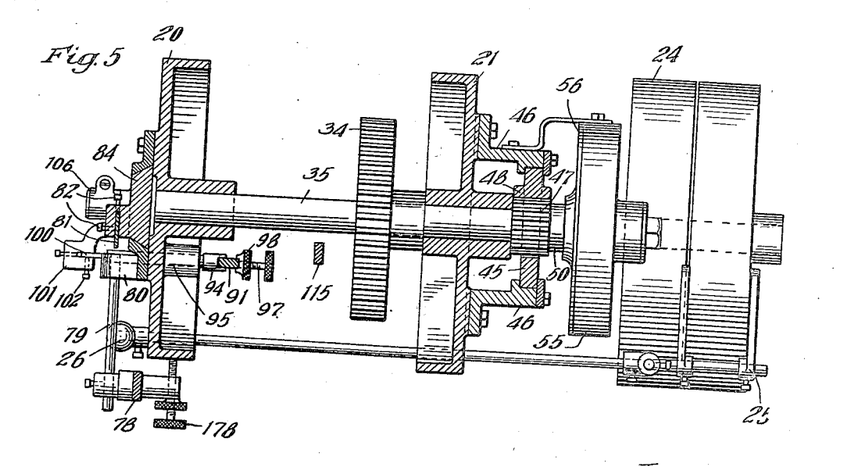
Figure 5 is a horizontal sectional view taken substantially on the line 5—5 of Figure 1.

If a large quantity of coils are to be made having uniform diameter throughout, then the adjustable set screw 178 may be utilized, by bearing against the machine frame as shown in Figure 5, to hold the lever 78 and thereby the forming tool 69 in one position. The plate cam 81 may thus be temporarily eliminated.

Figures 6, 7, 9, 17:
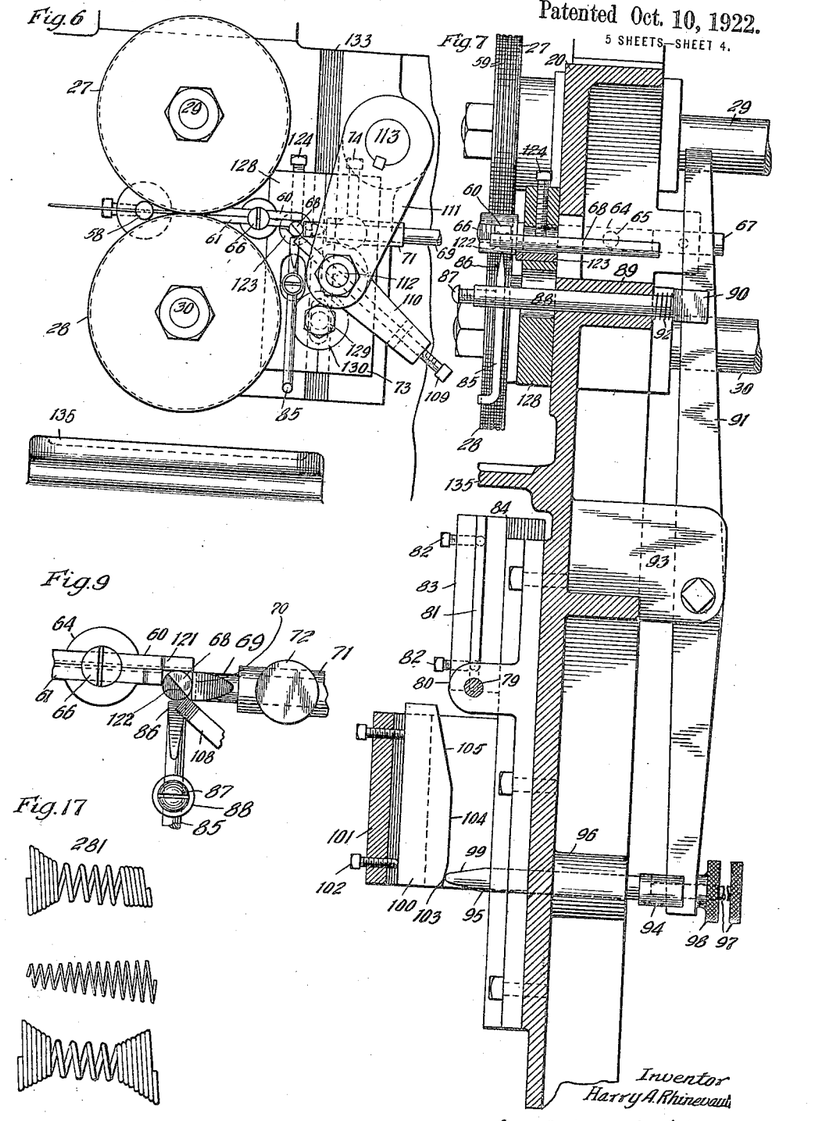
Figure 6 is a broken elevational view of a part of the structure illustrated in Figure 1 but on a somewhat larger scale, the figure disclosing more particularly those parts of the machine adjacent the forming and spacing tools.
Figure 7 is an enlarged vertical sectional view taken substantially on the line 7—7 of Figure 1.
Figure 9 is an elevational view corresponding to Figure 6 but illustrating on a much larger scale, the parts of the machine immediately involved in the forming of the springs or other articles.
Figure 17 consists of a group of diagrammatic illustrations of a number of different types of articles adapted to be made on my machine.

In order to vary the spacing of the coil turns, the following means are employed. Referring more particularly to Figures 1, 7 and 8, it will be noted that I use a spacing tool 85 having a tapered upper end 86 which is adapted to bear against and deflect the turns as they leave the forming tool 69. Said spacing tool 85 is held in vertical adjustable position by a set screw 87 in a horizontal slidably mounted rod 88. Said rod 88 is slidably mounted in a suitable bearing 89 provided in the wall of the machine and at its inner end, the rod 88 is forked as indicated at 90 to straddle a lever 91. A spring 92 is interposed between the forked end of the rod and the machine frame so as to normally retract the rod 88, that is, hold it in its innermost position. The lever 91 is pivotally mounted intermediate its ends on suitable brackets 93 carried by the machine frame, the lower end of the lever 91 entering a forked end 94 of a rod 95 horizontally slidably mounted in a suitable bearing 96 provided in the front wall of the machine. Adjustment between the rod 95 and lever 91 is obtained by a set screw 97 which is threaded through the lever 91 and has its inner end bearing against the bottom of the rod 95 between the forks thereof. A jam nut 98 may also be used. The outer end of the rod 95 is tapered and rounded off as indicated at 99 in Figure 7 and the same is adapted to cooperatively engage a second plate cam 100. Said plate cam 100 is adapted to be held in adjusted position in a second block-like projection 101 carried by the cross head 85 by means of set screws 102.

As indicated in Figures 5 and 7, the plate cam 100 extends in a plane perpendicular to the front wall of the machine, that is, at right angles to the plate cam 81 and is preferably located below the latter. By varying the contour of the edge of the plate cam 100, it is evident that the position of the spacing tool 85 can be correspondingly automatically determined.

As shown in Figure 7, the plate cam 100 has a short beveled section 103, a vertically extending section 104 and a longer beveled section 105. With this form of plate cam, the spacing 286 will, at the beginning of the formation of the coil, that is, as the cross head 84 starts downwardly, be withdrawn to the rear of the forming tool 69, as indicated in Figure 8. This permits of the first two or three turns of the coil being made with minimum spacing therebetween, that is, in as close contact as possible. As the plate cam 100 descends, the rod 95 will ride up the beveled section 103 until it reaches the vertical edge section 104 at which time the spacing tool 85 will have been forced outwardly, thereby causing the turns of the coil to be spaced more than at the beginning of the formation of the coil and this spacing will remain uniform so long as the rod 95 is riding on the vertical edge section 104.

As the plate cam 100 descends further, the rod 95 will ride down the beveled edge section 105, thereby permitting the final turns of the coil being gradually more closely spaced and ultimately with minimum spacing as the spacing tool 85 is withdrawn to an inoperative position. A coil having the turns thereof spaced in accordance with the formation of the plate cam 100 is indicated at 281 in Figure 17.

As will be evident from the preceding description taken in connection with the drawings, I am enabled to obtain any desired combination of shape and coil-turn spacing by suitably forming the edge contours of the plate cams 81 and 100. Either plate cam may be changed without the necessity of changing the other and such changes as are desired in the cams can be effected with very little labor. In actual practice, the desired edge contours are obtained by simply filing the edges of the plate cams while the plate cams are in position on the machine. Because of the location of the plate cams, which are obviously always readily accessible, the workman may file the same while in place and progressively determine the results of the changes by operating the machine slowly by hand. Furthermore, in actual practice, it has been found that only very small changes are required in the edges of the plate cams to obtain the necessary changes and variations in the articles being formed since a very slight difference in the edge of a plate cam, particularly the cam 81, will produce a relatively large change in the coil being formed. By employing the simple plate cams, not only is the initial cost of the cams reduced to a minimum but changes from time to time can be very easily made at a minimum cost and by workmen that need not be as skilled as those machinists required to effect changes in the ordinary grooved types of cams.

In order to shear the wire at the completion of each cycle of operations, the following means are employed. Referring more particularly to Figures 1, 2, 8 and 10, it will be seen that the shearing or cutting knife 108 is adjustably mounted by means of a set screw 109 in a block 110 adapted to be rigidly secured to a lever 111 by means of a slotted T-headed bolt 112. With the construction described, it is evident that the block 110 may be readily adjusted with respect to the lever 111 about the axis of the bolt 112 and secured in any such adjusted position. The lever 111 is carried at the front end of a cross shaft 113 which, intermediate its ends, is provided with a lever 114. Pivotally connected to the lever 114 is a link 115, the latter being pivotally attached at its lower end to a lever 116 carried by a stud shaft 117. The outer end of the lever 116 is provided with an antifriction roller 118 which rides upon and cooperates with a cam 119 keyed to the shaft 38. A suitable spring 120 is employed to normally hold down the lever 116 and therefore hold the knife 108 in its retracted inoperative position.

The knife 108 is adapted to cooperate with the mandrel 68, the latter being cut away at its outer end as indicated at 122 in such a way as to provide a shearing edge cooperable with the knife 108 as the latter is moved upwardly upon oscillation of the lever 111. In this connection, it will be observed that I have so formed my guiding die that the upper section 60 thereof projects over the mandrel 68 and beyond the lower section 61 of the die. This forms a substantially right angled recess in which the mandrel 68 is received so that, the guiding die block forms a backing for the mandrel on the opposite side thereof to that of the knife 108. Hence, during the shearing of the wire, the mandrel is backed by a substantial member and this is of extreme importance where springs or other articles of very small diameter and of very fine wire, are being made. In the case of such springs or other coiled articles, the size of the mandrel must necessarily be extremely small and in some instances, the mandrel will itself be a wire of comparatively small gauge. Where such mandrels of extremely small size are employed, it is absolutely necessary to provide a backing therefor during the shearing operation and this I obtain in the manner hereinbefore indicated. The guiding die is slightly cut away as indicated at 121 in order to provide necessary clearance for the knife 108 when it is working very close to the guiding die.

Figure 16:
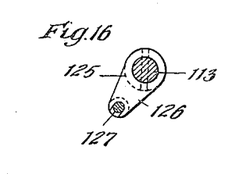
Figure 16 is a detail vertical sectional view taken substantially on the line 16—16 of Figure 4.

The mandrel 68 is adjustable inwardly and outwardly, the same being supported in a V-shaped block 123 and held by a set screw 124. It is also necessary to provide inward and outward adjustment for the knife 108 and this I accomplish by bodily adjusting the shaft 113. By referring to Figures 4 and 16, it will be seen that the shaft 113 is provided with two rigidly mounted collars 125—125 spaced to accommodate a plate 126. The plate 126 is extended radially and has swiveled therein an adjustable screw 127 which is threaded into the frame of the machine. By adjusting the screw 127, it is evident that the shaft 113 is moved back and forth so that the shearing knife 108 can be adjusted as desired with very little effort.

The V-shaped block 123 which sustains the mandrel 68 is carried by a larger block 128. Said block 128 and the block 73 adjacent thereto (see Figures 1 and 8), are adapted for vertical adjustment on the machine frame and are held in any adjusted position by means of the bolt 129 and washer 130. The proper vertical alinement of the blocks 73 and 128 is obtained by forming said blocks with inwardly extended flanges 131 and 132 respectively, which fit in a corresponding groove 133 provided in the front wall of the machine.

For convenience in operating the machine by hand, while it is being adjusted, the power shaft 23 may be extended to the front of the machine and provided with a squared section as indicated at 134 suitable to accommodate a crank by which the power shaft may be turned. A small shelf or table 135 may be cast integrally with the front wall of the machine as indicated in Figures 6 and 7 for the convenience of the operator. In actual practice, also, in order to minimize the amount of inward and outward adjustment of the various parts such as the guiding die, mandrel, forming tool and knife, the feed rolls 27 and 28 will be made reversible on their respective shafts so as to change the grooves.

In order to facilitate adjustments for feeding different lengths of wire, I have provided a scale 139 on the gear wheel 37 and a cooperating mark 140 on the cross head 40, as clearly indicated in Figure 3. By properly graduating the scale 139, it is evident that the adjustments can be made for feeding any desired length of wire.

I have herein shown and described what I now consider the preferred manner of carrying out the invention but the practical embodiment shown in the drawings and described in detail is merely illustrative and not by way of limitation. All changes and modifications are contemplated that come within the scope of the claims appended hereto.

I claim:

1. In a machine adapted for making helically coiled wire articles, having either uniform diameter and uniform pitch throughout, or any predetermined combination of variable pitch and variable diameter; the combination with the frame; of means for feeding the wire; a forming member; means determining the position of said forming member, including a cam corresponding to the length-wise contour of the article being formed; a pitch spacing member; and means determining the position of said spacing member, including a reciprocating cam corresponding to the predetermined spacing between turns of the article being formed.

2. In a machine adapted for making helically coiled articles of wire having either uniform or variable diameter; the combination with a frame; of means for feeding the wire; a forming member; means determining the position of said forming member including a reciprocating edge cam corresponding to the length-wise contour of the article being formed and connections between said cam and the forming member; and means for cutting the wire at the termination of the formation of the article.

3. In a machine adapted for making helically coiled articles of wire, having either uniform or variable coil-turn spacing; the combination with the frame; of means for feeding the wire; a forming member; a coil-turn spacing member; means determining the position of said spacing member including a reciprocating edge cam corresponding to the predetermined spacing between turns of the article being formed; and means for cutting the wire at the termination of the formation of the article.

4. In a machine adapted for making helically coiled articles of wire having either uniform or variable diameter; the combination with a frame; of means for feeding the wire; a forming member; means determining the position of said forming member including a reciprocating edge cam corresponding to the length-wise contour of the article being formed and connections between said cam and the forming member; means for cutting the wire at the termination of the formation of the article; and means for adjusting the operative position of said cam.

5. In a machine adapted for making helically coiled articles of wire, having either uniform or variable coil-turn spacing; the combination with the frame; of means for feeding the wire; a forming member; a coil-turn spacing member; means determining the position of said spacing member including, a reciprocating edge cam corresponding to the predetermined spacing between turns of the article being formed; means for cutting the wire at the termination of the formation of the article; and means for adjusting the operative position of said cam.

6. In a machine of the character described, the combination with geared co-operating wire feeding rolls, coil forming means and wire cutting means; of a power driven shaft; and means interposed between said shaft and said feed rolls for rotating the latter intermittently in the same direction through variable but predetermined definite arcs, said means including an adjustable element, an intermediate shaft, a rack operatively connected with said adjustable element, a pinion co-operable with said rack, gearing between said intermediate shaft and the feed rolls, and a clutch interposed between said pinion and intermediate shaft, said clutch comprising an annular casing, a hub, and spring controlled fingers mounted on said hub, and having the outer ends thereof adapted to frictionally instantaneously grip the inner surface of said casing at any point.

7. In a machine adapted for the making of helically coiled wire articles, having any predetermined combination of uniform or variable diameter and uniform or variable coil-turn spacing, the combination with a frame; of wire feeding and guiding means; a mandrel; a forming tool co-operable with said mandrel; a forming tool control cam; a coil-turn spacing tool; a spacing tool control cam; and means for cutting the wire; both of said cams, the forming tool and coil-turn spacing tool being all disposed on the outer side of said frame and thereby readily accessible for inspection or adjustment.

8. In a machine adapted for making helically coiled articles of wire having either uniform diameter and uniform coil-turn spacing throughout or any predetermined combination of variable coil-turn spacing and variable diameter; the combination with a frame; of means for feeding the wire; a forming member; means determining the position of said forming member including, a reciprocating cam corresponding to the lengthwise contour of the article being formed; a coil-turn spacing member; means determining the position of said spacing member including, a cam corresponding to the predetermined spacing between turns of the article being formed.

9. In a machine adapted for making helically coiled articles of wire having either uniform diameter and uniform coil-turn spacing throughout or any predetermined combination of variable coil-turn spacing and variable diameter, the combination with a frame; of means for feeding the wire; a forming member; means determining the position of said forming member including, a reciprocating cam corresponding to the lengthwise contour of the article being formed; a coil-turn spacing member; means determining the position of said spacing member including, a reciprocating cam corresponding to the predetermined spacing between turns of the article being formed; each of said cams being of non-circular plate formation with one edge thereof of the desired shape to govern the movements of the respective forming and spacing members.

10. In a machine adapted for making helically coiled articles of wire having either uniform diameter and uniform coil-turn spacing throughout or any predetermined combination of variable coil-turn spacing and variable diameter; the combination with a frame; of means for feeding the wire; a forming member; means determining the position of said forming member including, a cam corresponding to the lengthwise contour of the article being formed; a coil-turn spacing member; means determining the position of said spacing member including, a cam corresponding to the predetermined spacing between turns of the article being formed; each of said cams being of non-circular plate formation with one edge thereof of the desired shape to govern the movements of the respective forming and spacing members, said cams being disposed at right angles to each other and the forming and spacing members being mounted for movement also at right angles to each other.

11. In a machine adapted for the making of helically coiled wire articles having any predetermined combination of uniform or variable diameter and uniform or variable coil-turn spacing, the combination with a frame, of means for feeding wire; coil-forming means; a cam governing said means; coil-turn spacing means; a cam governing said spacing means; and a slidable cross head on which said cams are carried.

12. In a machine adapted for the making of helically coiled wire articles having any predetermined combination of uniform or variable diameter and uniform or variable coil-turn spacing, the combination with a frame; of adjustable means for intermittently feeding different lengths of wire; coil-forming means; coil-turn spacing means; a slidable cross head; a cam governing said forming means and adjustably mounted on said cross head; and a cam governing said spacing means adjustably mounted on said cross head.

13. In a machine for helically coiling wire, the combination with a wire guiding die having an overhanging projection thereby providing a corner in the die; of a mandrel positioned within said corner, whereby said die is adapted to act as a backing support for the mandrel; means for coiling the wire associated with said mandrel; and a cutting tool cooperable with said mandrel, said cutting tool being disposed on the opposite side of the mandrel to that of said die.

14. In a machine for helically coiling wire, the combination with a wire guiding die consisting of two separable sections, one section projecting beyond the other at the delivery end of the die; of an adjustably mounted and replaceable mandrel disposed within the angle formed where the one section projects beyond the other section whereby the die is adapted to act as a backing support for said mandrel, said mandrel having a cutting edge; coil-forming means associated with said mandrel; and a movably mounted cutting tool adapted to cooperate with said cutting edge of the mandrel.

15. In a machine of the character described, the combination with geared cooperating wire feeding rolls, coil-forming means and wire-cutting means; of a power driven shaft; and means interposed between said shaft and said feed rolls for rotating the latter intermittently in the same direction through variable but predetermined definite arcs, said means including, a reciprocating cross head, a pitman pivotally connected to one end of said cross head and radially adjustably pivotally connected with said shaft, an intermediate shaft, rack and pinion gearing between said cross head and intermediate shaft, an instantaneously, positively-operating one-way automatically acting self-contained friction clutch between said pinion and intermediate shaft, and gearing between said intermediate shaft and the feed rolls.

16. In a machine adapted for the making of helically coiled wire articles having any predetermined combination of uniform or variable diameter and uniform or variable coil turn spacing, the combination with a frame, wire feeding and guiding means, a mandrel, and a forming tool cooperable with said mandrel; of a forming tool control cam; a coil turn spacing tool; and a spacing tool control cam, both of said cams being disposed on the outer side of said frame readily accessible for inspection or adjustment.

17. In a machine adapted for the making of helically coiled wire articles having any predetermined combination of uniform or variable diameter and uniform or variable coil-turn spacing, the combination with a frame having a vertical front wall; of wire feeding and guiding means; a mandrel; a forming tool cooperable with said mandrel; a cam governing the position of said forming tool; a coil-turn spacing tool; a cam governing the position of said spacing tool; and means for cutting the wire; both of said cams, the forming tool, the coil-turn spacing tool and the feeding and guiding means all being disposed on the outer face of said wall of the frame and there readily available for inspection or adjustment.

18. In a machine adapted for the making of helically coiled wire articles having any predetermined combination of uniform or variable diameter and uniform or variable coil-turn spacing, the combination with a frame having a vertically extending wall; of a mandrel extending perpendicularly from said wall; wire feeding and guiding means; a forming tool cooperable with said mandrel; a lever pivotally mounted on said frame to swing in a plane parallel to said wall; a plate cam extending in a plane parallel to said wall and having one edge thereof adapted to govern the position of said lever and forming tool; a coil-turn spacing tool adjustable back and forth in a plane perpendicular to said wall; a lever for actuating said spacing tool pivoted to said frame to swing in a plane perpendicular to said wall; a plate cam extending in a plane perpendicular to said wall and having one edge thereof adapted to govern the position of said lever and spacing tool; and a vertically reciprocating cross head upon which said plate cams are mounted.

19. In a machine adapted for the making of helically coiled wire articles having any predetermined combination of uniform or variable diameter and uniform or variable coil-turn spacing, the combination with a frame; of wire feeding and guiding means including a guiding die having a notch formed therein; a mandrel positioned within said notch whereby the guiding die is adapted to form a backing support for the mandrel; cutting means cooperable with said mandrel; a forming tool cooperable with said mandrel; a plate cam governing the position of said forming tool; a coil-turn spacing tool; means governing the position of said spacing tool; and adjustable means for intermittently operating said wire feeding means always in the same direction to feed a predetermined, definite amount of wire.

20. In a machine of the character described, the combination with wire-feeding rolls, coil-forming means, and wire-cutting means; of a power driven shaft; and means interposed between said shaft and said feed rolls for rotating the latter intermittently in the same direction through variable but predetermined definite arcs, said means including, an adjustable element, gearing, and a clutch, the latter comprising an annular casing, a hub, and spring-controlled fingers mounted on said hub having the outer ends thereof adapted to frictionally and instantaneously grip the inner surface of said casing at any point.

21. In a machine adapted for making helically coiled articles of wire, having either uniform or variable coil-turn spacing, the combination with means for feeding the wire; of a forming member; a coil-turn spacing member; and means for determining the position of said spacing member including a non-rotatable cam having its edge of a contour co-related with the predetermined spacing between turns of the article being formed.

22. In a machine adapted for making helically coiled articles of wire having either uniform or variable diameter: the combination of means for feeding the wire; of a forming member; and means determining the position of said forming member including a non-rotatable cam having an edge thereof of a contour corresponding to the lengthwise contour of the article being formed.

23. In a machine adapted for making helically coiled articles of wire having either uniform or variable coil-turn spacing: the combination of means for feeding the wire; of a forming member; a coil-turn spacing member; and means determining the position of said spacing member including, a reciprocating cam corresponding to the predetermined spacing between turns of the article being formed.

24. In a machine adapted for making helically coiled articles of wire having either uniform or variable diameter: the combination of means for feeding the wire; of a forming member; and means determining the position of said forming member including a reciprocating cam corresponding to the lengthwise contour of the article being formed.

25. In a machine adapted for making helically coiled wire articles having either uniform diameter and uniform pitch throughout or any predetermined combination of pitch and diameter: the combination with a frame; of means for feeding the wire; a forming member; a pitch-spacing member; and means for determining the positions of said spacing and forming members each including a non-rotatable cam having an edge thereof formed to govern the respective member.

In witness that I claim the foregoing I have hereunto subscribed my name this 2nd day of Feb., 1920.

HARRY ARNOLD RHINEVAULT.

Witness:
CARRIE GAILING.